(12) United States Patent
Lee

(10) Patent No.: US 7,971,568 B2
(45) Date of Patent: Jul. 5, 2011

(54) PISTON OF GASOLINE DIRECT INJECTION ENGINE

(75) Inventor: Jae Kwon Lee, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/511,853

(22) Filed: Jul. 29, 2009

(65) Prior Publication Data

US 2010/0132662 A1    Jun. 3, 2010

(30) Foreign Application Priority Data

Dec. 2, 2008  (KR) ................. 10-2008-0121488

(51) Int. Cl.
*F02F 3/24* (2006.01)
(52) U.S. Cl. .............. 123/307; 123/193.6; 123/197.2
(58) Field of Classification Search .......... 123/301, 123/302, 307, 256, 276, 279, 281, 282, 285, 123/193.6, 197.2, 568.11, 568.13, 568.14
See application file for complete search history.

(56) References Cited

U.S. PATENT DOCUMENTS

| | | | | |
|---|---|---|---|---|
| 4,300,499 A * | 11/1981 | Nakanishi et al. | ............ | 123/307 |
| 4,541,377 A * | 9/1985 | Amos | ............ | 123/307 |
| 5,195,488 A * | 3/1993 | Rattigan | ............ | 123/308 |
| RE36,500 E * | 1/2000 | Ando et al. | ............ | 123/193.4 |
| 6,223,715 B1 * | 5/2001 | Suzuki | ............ | 123/294 |
| 6,253,728 B1 * | 7/2001 | Matayoshi et al. | ............ | 123/301 |
| 6,286,477 B1 * | 9/2001 | Yang et al. | ............ | 123/276 |
| 6,382,176 B1 * | 5/2002 | Cobb, Jr. | ............ | 123/298 |
| 6,443,122 B1 * | 9/2002 | Denbratt et al. | ............ | 123/301 |
| 6,494,178 B1 * | 12/2002 | Cleary et al. | ............ | 123/276 |
| 6,588,396 B1 * | 7/2003 | Cleary et al. | ............ | 123/276 |
| 6,612,282 B2 * | 9/2003 | Yu | ............ | 123/262 |
| 6,745,745 B2 * | 6/2004 | Huebler et al. | ............ | 123/307 |
| 6,910,455 B2 * | 6/2005 | Sczepanski et al. | ............ | 123/193.6 |
| 2003/0075141 A1 * | 4/2003 | Ohta et al. | ............ | 123/301 |
| 2003/0140891 A1 * | 7/2003 | Cathcart et al. | ............ | 123/301 |
| 2003/0172896 A1 * | 9/2003 | Sczepanski et al. | ............ | 123/193.6 |
| 2004/0216715 A1 * | 11/2004 | Schmitz et al. | ............ | 123/295 |
| 2007/0084449 A1 * | 4/2007 | Najt et al. | ............ | 123/668 |
| 2007/0235004 A1 * | 10/2007 | Yi et al. | ............ | 123/298 |

* cited by examiner

*Primary Examiner* — John T Kwon
*Assistant Examiner* — Johnny H Hoang
(74) *Attorney, Agent, or Firm* — Morgan, Lewis & Bockius LLP

(57) ABSTRACT

A piston of a gasoline direct engine may include a protuberance portion protruding along a circular arc shape having a radius (R1) equal to the piston diameter to have a predetermined height (T) from the upper surface thereof, and the edge of the protuberance portion is rounded to be connected with the upper surface; a bowl (B) having a bottom surface (F1) having an asymmetrical ellipse shape from the center of the protuberance portion to the intake side direction thereof, wherein the bottom surface thereof becomes deeper in the exhaust side direction to have a predetermined slope angle ($\theta1$), and the inner wall portion thereof has a circular arc shape to form a predetermined rising angle ($\theta2$) at the upper part thereof; and trumpet portions (TR) of which edge ends (E) thereof are expanded in the intake side direction of the protuberance portion to be connected to the bowl (B).

12 Claims, 7 Drawing Sheets

PISTON OF GASOLINE DIRECT INJECTION ENGINE

CROSS-REFERENCE TO RELATED APPLICATION

The present application claims priority to Korean Patent Application No. 10-2008-0121488 filed on Dec. 2, 2008, the entire contents of which are incorporated herein for all purposes by this reference.

BACKGROUND OF THE INVENTION

1. Field of the Invention

The present invention relates to a piston of a gasoline direct injection engine, and more particularly to a piston of a gasoline direct engine that stratifies an air-fuel mixture through efficient tumble flow thereof.

2. Description of Related Art

Generally, a gasoline direct injection engine directly injects gasoline fuel into a combustion chamber thereof to combust therein.

In designing a gasoline direct injection engine, an important factor is the intake flow of air-fuel mixture, and the intake flow is determined by an intake port, a combustion chamber, and a piston shape.

Further, the intake flow is made to prevent the injected fuel from colliding with the piston surface, to appropriately mix the air-fuel to be evaporated, to optimize the atomization thereof, and to stratify the air-fuel mixture, and related investigations have been actively undertaken.

Particularly, the combustion chamber includes the upper surface of the piston together with the lower surface of a cylinder head, and the air that flows in through the intake port and the fuel that is injected into the combustion chamber during the compression stroke are mixed to form an air-fuel mixture such that the flow thereof is stratified to be combusted.

Further, the piston of the gasoline direct injection engine is developed to securely stratify the air-fuel mixture according to the engine load and the speed thereof.

A bowl of the upper surface of the piston has a uniform curvature according to the conventional art to form a gentle sphere surface such that the tumble flow is weak, and therefore there is a problem in stratifying the air-fuel mixture around a spark plug by second fuel injection and first fuel injection for optimizing flow.

Also, when the fuel that is injected through the injector collides with the bottom surface of the bowl of the piston, it takes a long time for the attached fuel to evaporate such that soot and hydrocarbons are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a piston of a gasoline direct engine in which depth, slope degree, and rising angle of a bowl are determined to cause efficient tumble flow of an air-fuel mixture of secondarily injected fuel that is injected at the back end of a compression stroke, after primarily injected fuel is injected at the back end of an intake stroke for optimizing flow, such that the air-fuel mixture is stratified at a low speed and low load condition of an engine, and to provide a piston of a gasoline direct engine in which the tip portion of a bowl is rounded to minimize concentration of combustion pressure and heat, while simultaneously a trumpet portion is enlarged with a gentle angle along an edge end of a protuberance portion that encircles the bowl to sustain the flowing speed of the air-fuel mixture that rotates around the edge of the piston through squish flow such that the air-fuel mixture moves to the intake side without congestion and accordingly stratifies the dense air-fuel mixture around a spark plug in company with the secondarily injected fuel.

The piston of a gasoline direct engine, may include a protuberance portion that protrudes upwards from an upper surface of the piston along a convexly circular arc shape having a radius (R1) that is about the same as a piston diameter (D) in an axis of a piston center (SP) to have a predetermined height (T) from the upper surface of the piston, and distal edge portion of the protuberance portion is concavely rounded to be connected with the upper surface, a bowl (B) that has a bottom surface (F1) dented downwards from the upper surface of the piston, wherein the bowl (B) has an asymmetrical ellipse shape from a center portion of the protuberance portion to an intake side direction of the piston, the bottom surface of the bowl (B) becomes deeper in an exhaust side direction of the piston to have a predetermined slope angle ($\theta 1$), and an inner wall portion formed deepest in the bottom surface of the bowl (B) has a concavely circular arc shape to form a predetermined rising angle ($\theta 2$) at a tip portion thereof, and trumpet portions (TR), one edges of which are connected to edge ends (E) of the protuberance portion and the other edges of which are expanded in the intake side direction of the piston to be connected to the bowl (B).

The predetermined height (T) of the protuberance portion may be in a range of approximately 5% to approximately 5.5% of the piston diameter (D).

The distal edge portion of the protuberance portion may be formed along a round surface (RS1) of a circular arc (C2) having a diameter (D1) ranging from approximately 80% to approximately 84% of the piston diameter (D).

The protuberance portion may have a diameter (D2) ranging from approximately 78% to approximately 82% of the piston diameter (D) based on a point (P1) that is offset with a distance ranging from approximately 5% to approximately 7% of the piston diameter (D) from the piston center (SP) in the exhaust side direction to form a protuberance side end (V) of the distal edge portion to be connected to the upper surface of the piston.

The protuberance side end (V) may be connected to the upper surface of the piston along a round surface (RS1) of a circular arc (C2) having a diameter (D1) ranging from approximately 80% to approximately 84% of the piston diameter (D).

A connection point (P2) of the protuberance side end (V) and the edge ends (E) of the protuberance portion may be determined in a point that is offset as much as a distance ranging from approximately 3% to approximately 5% of the piston diameter (D) from the piston center (SP) to the exhaust side direction.

The predetermined slope angle ($\theta 1$) of the bottom surface may be determined such that the maximum depth of the bowl ranges from approximately 1% to approximately 1.25% of the piston diameter (D) from the upper surface.

The bottom surface may extend in a predetermined distance between pockets of intake valves and is aligned to a fuel injector.

The edge ends (E) of the protuberance portion may be formed with a circular arc (C6) having a diameter (D3) ranging from approximately 100% to approximately 105% of the piston diameter (D) based on a point (P3) that is offset by as much as a distance of approximately one third of the piston diameter (D) from the piston center (SP) to the exhaust side direction.

A tangential line angle ($\theta 3$) between two points connecting the edge ends (E) and outer circumference of the bowl (B) may be approximately 100°.

The tip portion (TP) of the bowl may be formed along a predetermined curvature with the inner wall portion of the bowl.

The predetermined rising angle ($\theta 2$) of the inner wall portion as a tangential line angle to the tip portion of the bowl may be approximately 65°.

In another aspect of the present invention, in the piston of a gasoline direct engine, the depth, slope degree, and rising angle of a bowl may be determined to cause efficient tumble flow of an air-fuel mixture of secondarily injected fuel that is injected at the back end of the compression stroke, after primarily injected is injected at the back end of the intake stroke for optimizing flow, so as to stratify the air-fuel mixture at a low speed and low load condition of an engine, such that the driving performance is enhanced and the exhaust temperature is sustained to effectively operate a catalyst.

Also, the tip portion of a bowl may be rounded to minimize the concentration of combustion pressure and heat, while simultaneously a trumpet portion is enlarged with a gentle angle along an edge end of the protuberance portion that encircles the bowl to sustain the flowing speed of the air-fuel mixture that rotates around the edge of the piston through squish flow such that the air-fuel mixture moves to the intake side without congestion, and accordingly the dense air-fuel mixture is stratified around a spark plug in company with the secondarily injected fuel.

Further, the pollutants of exhaust gas can be minimized through the strong tumble flow and the rapid fuel evaporation during engine start-up at a low temperature.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
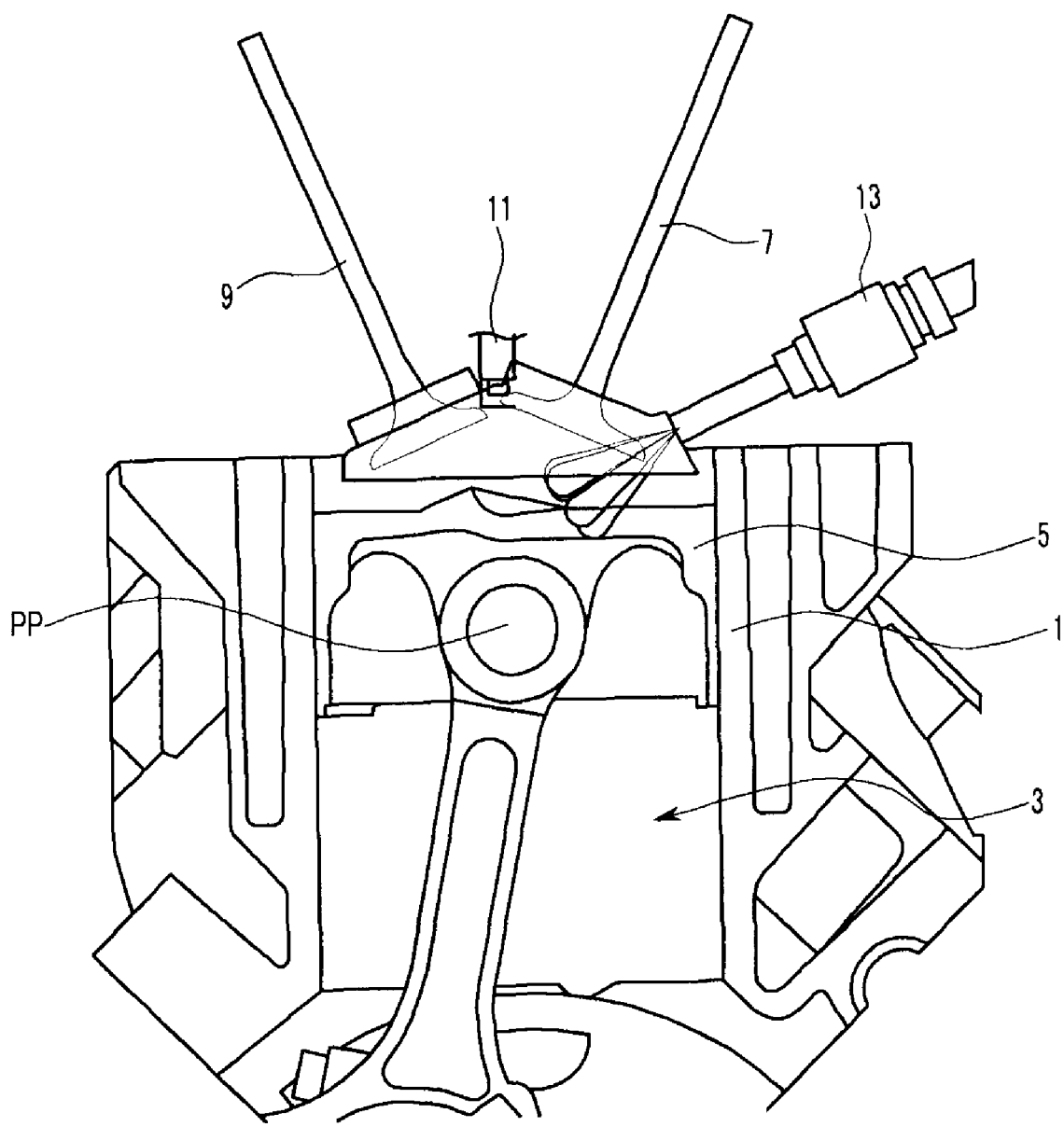
FIG. 1 is a longitudinal cross-sectional view of a gasoline direct injection engine in which a piston according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
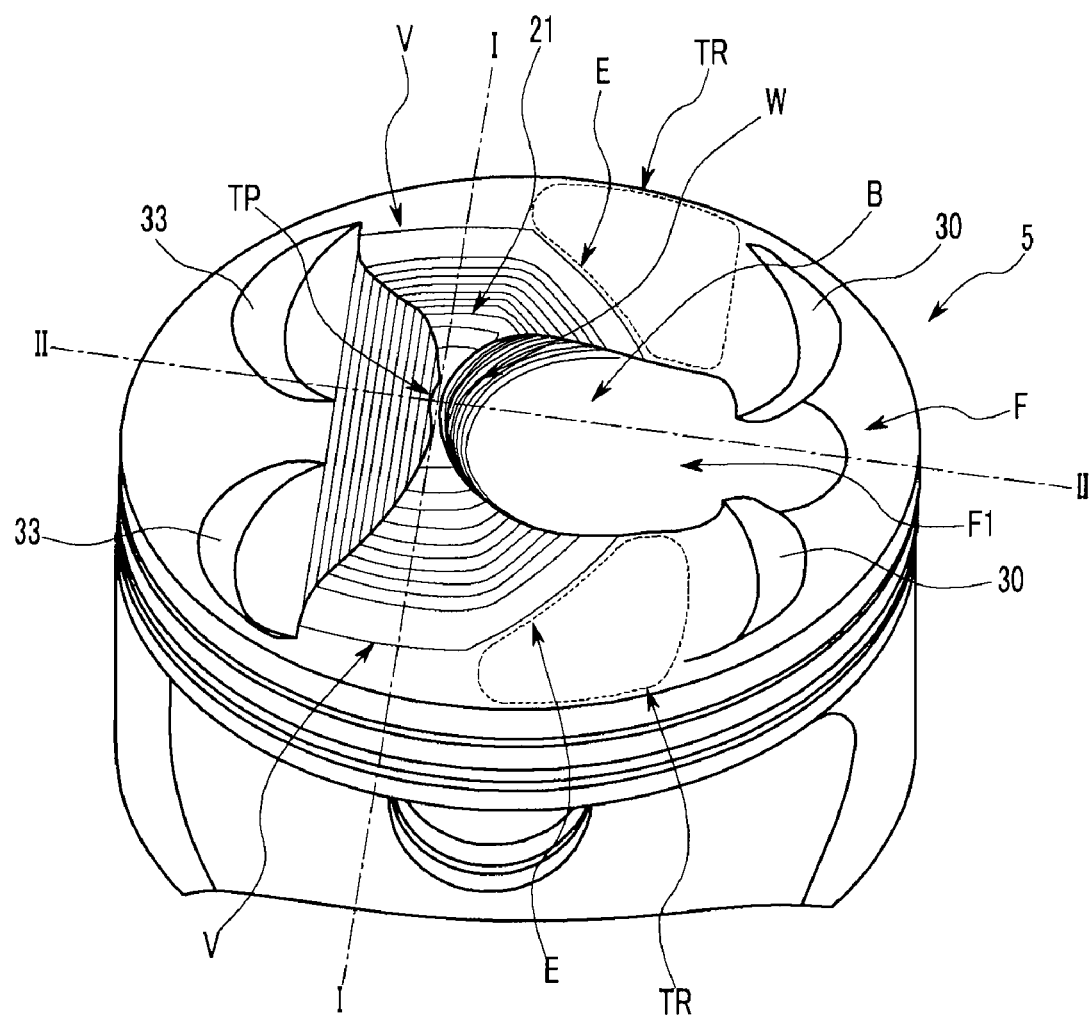
FIG. 2 is a perspective view of a piston of a gasoline direct engine according to an exemplary embodiment of the present invention.

FIG. 1 is a longitudinal cross-sectional view of a gasoline direct injection engine in which a piston according to an exemplary embodiment of the present invention is applied, and FIG. 2 is a perspective view of a piston of a gasoline direct engine according to an exemplary embodiment of the present invention.

First, as shown in FIG. 1, a gasoline direct injection engine in which a piston according to the present exemplary embodiment is applied includes a cylinder head and an engine main body as a cylinder block 1, and a piston 5 is disposed inside a cylinder 3 of the cylinder block 1.

The combustion chamber is formed between the lower surface of the cylinder head and the upper surface of the piston 5 inside the cylinder 3, and intake/exhaust valves 7 and 9 are respectively disposed correspondingly to intake/exhaust ports that are disposed at both sides of the cylinder head at the combustion chamber.

A spark plug 11 is mounted at the center of the lower surface of the cylinder head correspondingly to the combustion chamber, and an injector 13 is mounted at one side of the cylinder head to directly inject fuel into the combustion chamber.

Figure 3:
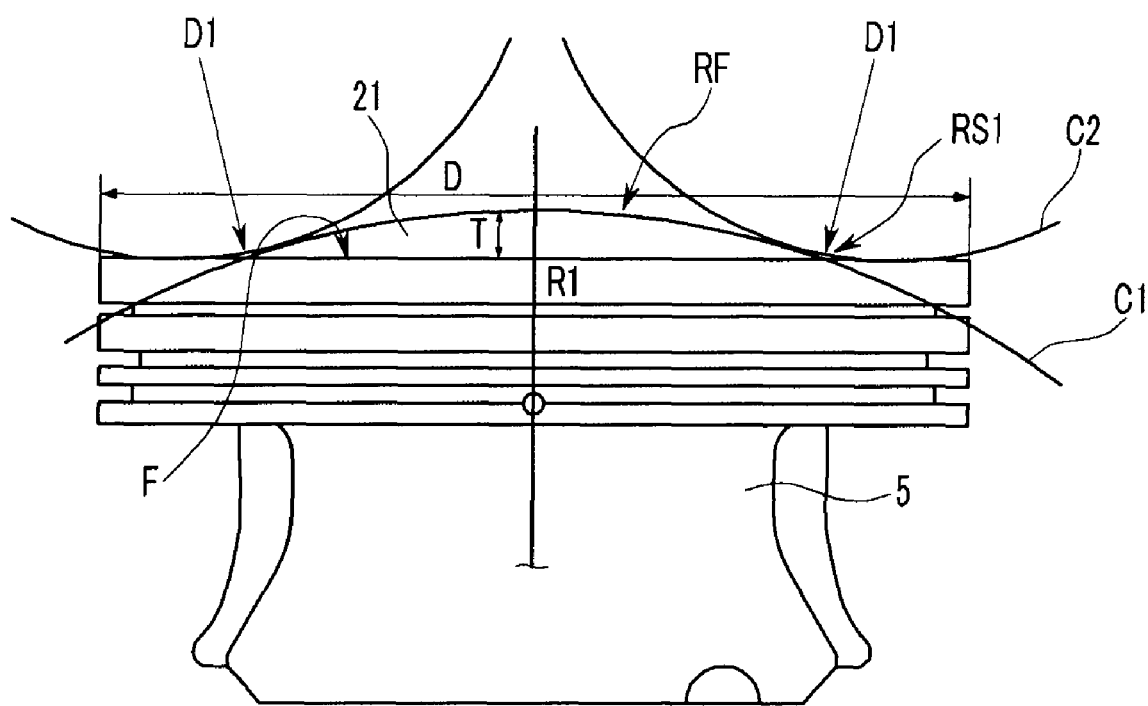
FIG. 3 is a side view of a piston along I-I of FIG. 2 according to an exemplary embodiment of the present invention.

As shown in FIG. 2 and FIG. 3, in the piston 5 applied in the gasoline direct injection engine, a protuberance portion 21 is formed at the upper surface of the piston 5 along a circular arc Cl having a radius RI that is as large as the diameter (D) of the piston 5.

In an exemplary embodiment of the present invention, the protuberance portion 21 may be formed between pockets 30 of intake valves and pockets 33 of exhaust valves.

However, the diameter (D) of the piston 5 that is applied in the present exemplary embodiment may be determined to be 96 mm, which will be detailed hereinafter.

That is, the protuberance portion 21 has a predetermined height (T) from the upper surface (F) of the piston 5, and the edge thereof is formed along a rounded surface RS1 on the upper surface (F).

Here, if the diameter of the piston 5 is 96 mm, the height (T) of the protuberance portion 21 can be determined to be 5.3 mm, which is in a range of 5% to 5.5% of the diameter of the piston 5.

Also, the edge of the protuberance portion 21 is formed along the rounded surface RS1 of the circumscribed circular arc C2 having diameter D1, 80 mm, ranging from 80% to 84% of the piston diameter (D) on the upper surface (F) of the piston 5.

Figure 4:
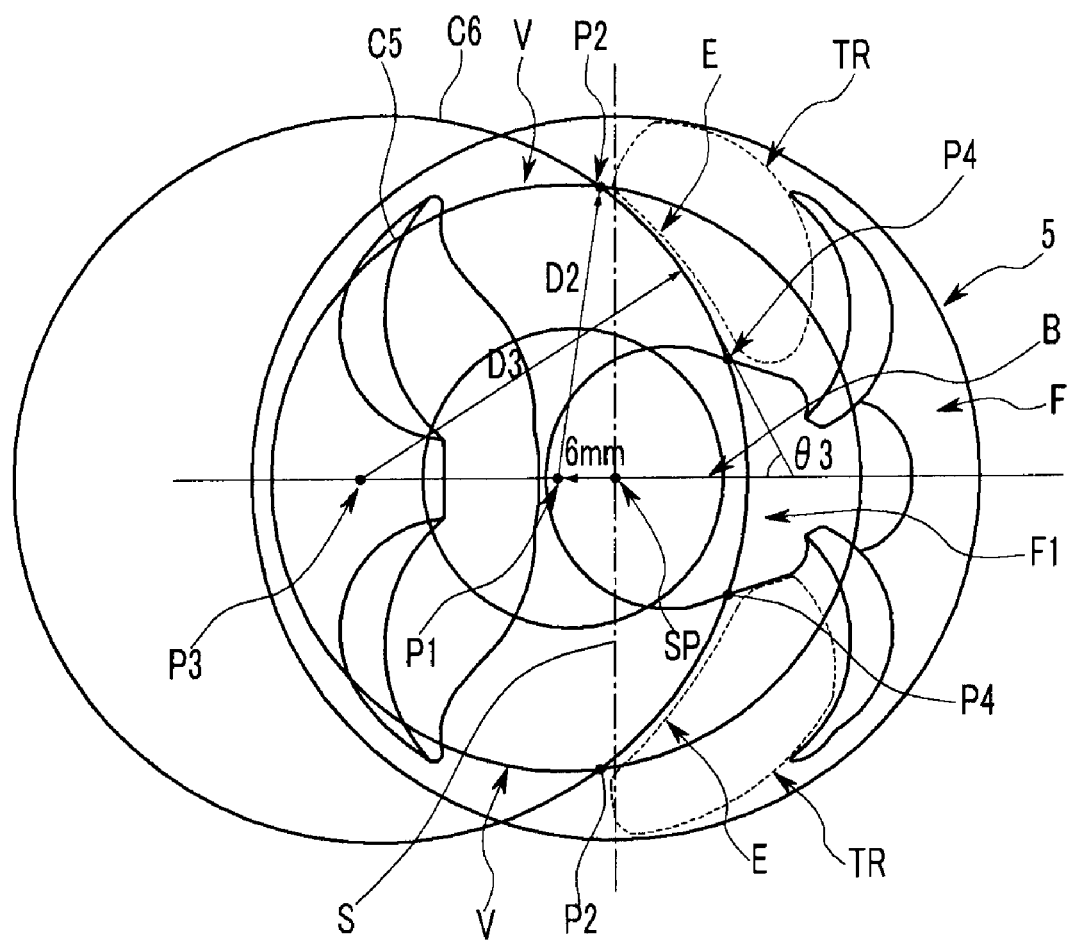
FIG. 4 is a top plan view of a piston according to an exemplary embodiment of the present invention.

As shown in FIG. 4, between the piston upper surface (F) and the edge of the protuberance portion 21, a protuberance side end (V) is formed along the circular arc C5 of diameter D2, 80 mm, ranging from 78% to 82% of the piston diameter (D) based on the point P1 that is offset from the center (SP) of the piston 5 to the exhaust side by as much as 6 mm, ranging from 5% to 7% of the piston diameter (D).

Figure 5:
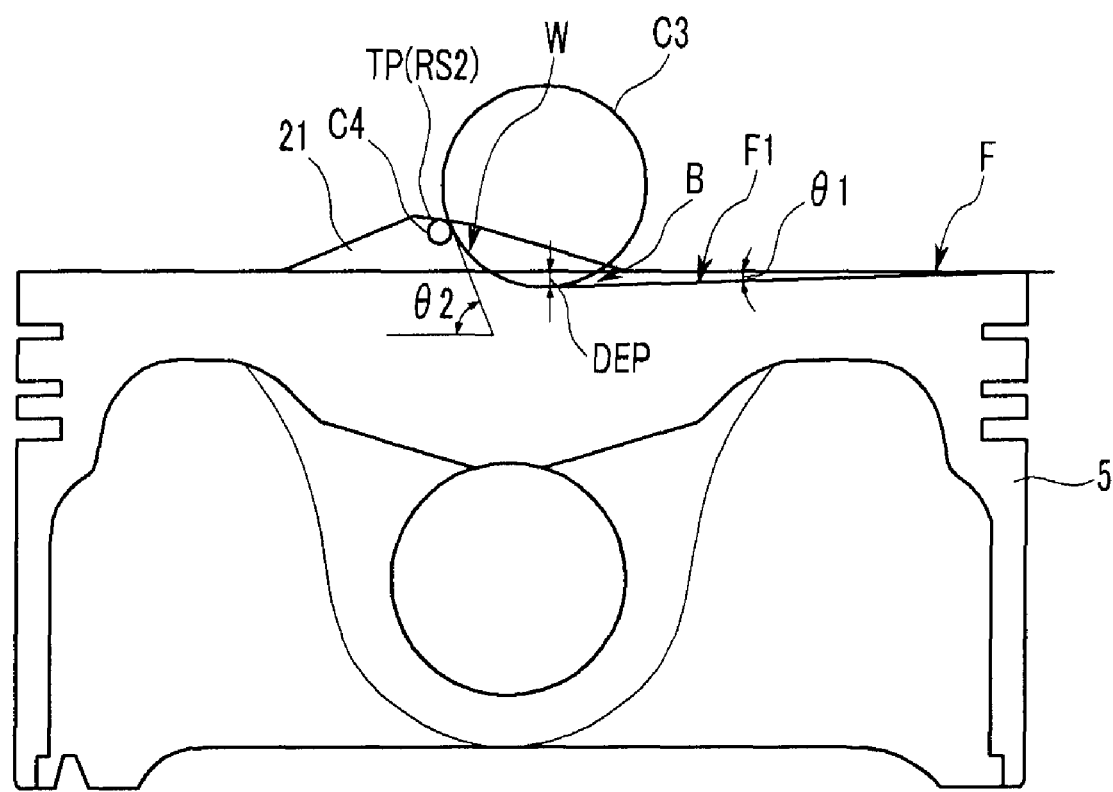
FIG. 5 is a cross-sectional view of a piston along II-II of FIG. 2 according to an exemplary embodiment of the present invention.

As shown in FIG. 2 and FIG. 5, a bowl (B) is formed on the upper surface (F) of the piston 5 to have a bottom surface F1 of an asymmetrical ellipse shape that becomes narrower toward the intake side from the center of the protuberance portion 21.

In an exemplary embodiment of the present invention, the bowl (B) may extend between pockets 33 of the intake valves 7. The longitudinal direction of the blow (B) may be aligned toward the fuel injector 13 to receive the fuel therein.

The bottom surface F1 of the bowl (B) becomes deeper toward the exhaust side from the intake side to have a predetermined slope angle θ1, an inner wall portion (W) of the intake side is formed along a circular arc C3, and the upper portion of the inner wall portion has a rising angle θ2.

As shown in FIG. 4, the bottom surface F1 of the asymmetrical ellipse shape becomes narrower towards the intake side from the center of the protuberance portion 21, and as shown in FIG. 5, the predetermined slope angle θ1 of the bottom surface F1 is about 1.5° such that the maximum depth (DEP) of the bowl (B) becomes 1.1 mm that is in a range of 1% to 1.25% of the piston diameter (D) based on the piston upper surface (F).

The rising angle θ2 of the intake side of the inner wall portion (W) of the bowl (B) is 65° as a tangential line angle of a circular arc in a tip portion (TP) of the bowl (B), and the tip portion (TP) of the bowl (B) is formed along the round surface RS2 and a circular arc C4 having a diameter of 2 mm such that the concentration of the combustion pressure and heat are minimized.

Further, as shown in FIG. 4, both edge ends (E) of the protuberance portion 21 are respectively enlarged with a predetermined angle towards the intake side of the piston upper surface (F) to form a trumpet portion (TR) that is connected to the bowl (B) such that the air-fuel mixture rotates around the piston by squish flow with a predetermined speed.

That is, the trumpet portion (TR) is formed from the point P2 where the protuberance side end (V) and the edge end (E) of the protuberance portion 21 are connected, and the point P2 is determined to be moved from the center line (S) of the piston pin (PP) by as much as a distance ranging from 3% to 5% of the piston diameter (D).

The trumpet portion (TR) is formed by both edge ends (E) of the protuberance portion 21, and the both edge ends (E) are formed along a circular arc C6 having a diameter D3, 98 mm, ranging from 100% to 105% of the piston diameter (D) based on the point P3 that is moved from the center (SP) of the piston 5 as much as a distance of one third of the piston diameter (D).

Here, the trumpet portion (TR) is formed by the enlarged edge end (E), and the enlargement angle θ3 of the edge end (E) is set to about 50° as the circular arc tangential line angle in the connection point P4 of the bowl (B) and the edge end (E).

As stated above, the protuberance side end (V) having the diameter D2, 80 mm, ranging from 78% to 82% of the diameter (D), is formed along the edge of the protuberance portion 21 of the piston 5 of a gasoline direct engine, both edge ends (E) of the protuberance portion 21 are enlarged towards the intake side of the piston upper surface (F) to have the enlargement angle θ3 of 50°, and the trumpet portion (TR) is connected to the bowl (B).

Figure 6:
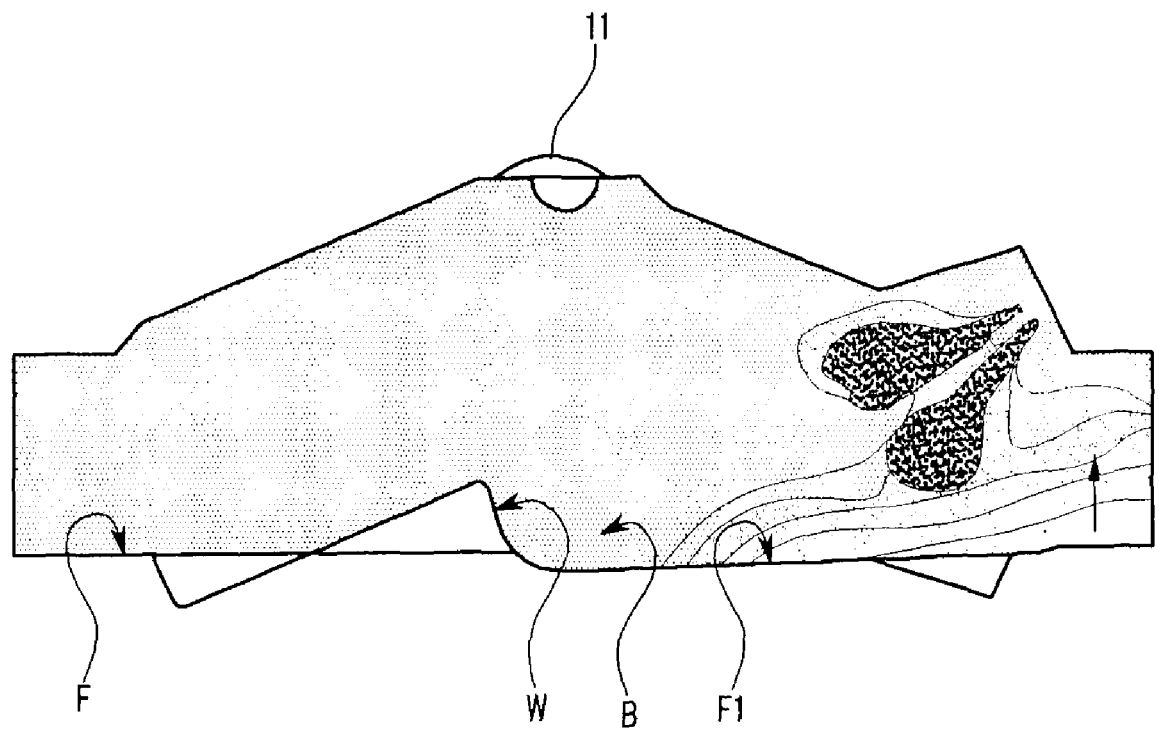
FIG. 6 is a diagram showing the flow of the air-fuel mixture during the secondary fuel injection of the compression stroke of a piston according to an exemplary embodiment of the present invention.
Figure 7:
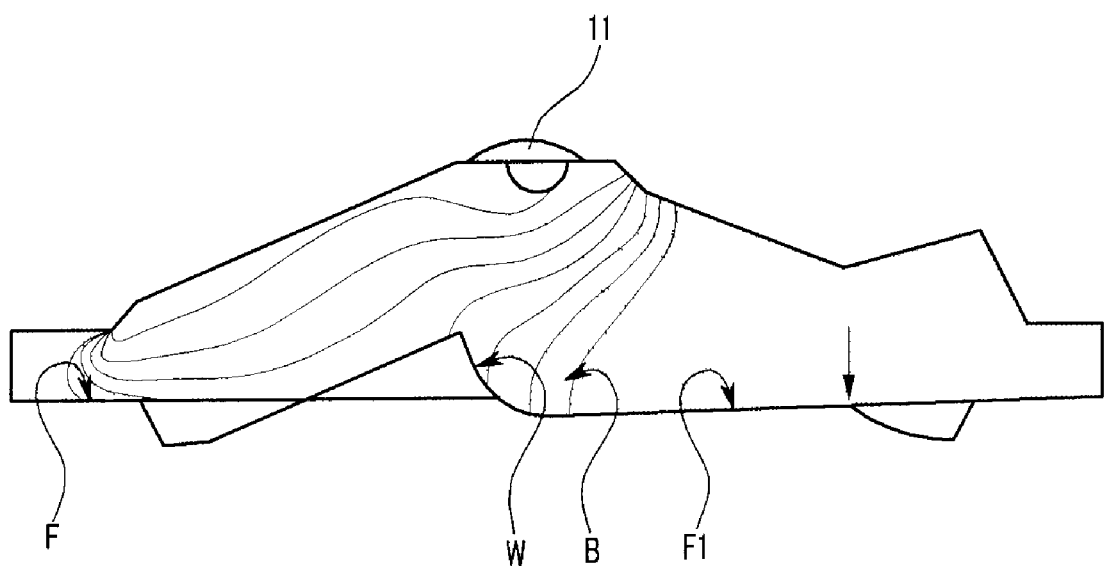
FIG. 7 is a diagram showing the air-fuel mixture that is stratified around a spark plug during the expansion stroke of a piston according to an exemplary embodiment of the present invention.

Accordingly, as shown in FIG. 6, a sufficient movement route for the air-fuel mixture that rotates around the edge of the piston is procured by squish flow and the flowing speed thereof is simultaneously sustained, while the first injection fuel gathers around the center of the cylinder during the piston compression stroke, a secondary fuel injection that is performed at the back end of the piston compression stroke forms a high tumble flow, such that the air-fuel mixture is induced to be stratified around the spark plug 11 as shown in FIG. 7.

Also, the maximum depth of the bottom surface F1 of the bowl (B) ranges from 1% to 1.25% of the piston diameter (D) such that the slope angle θ1 is about 1.5°, and the intake side rising angle θ2 of the inner wall portion (W) of the bowl (B) is set to about 65° such that the tumble flow of the secondary injection fuel is enhanced to induce the air-fuel mixture around the spark plug 11 to be stratified.

The strong tumble flow of the air-fuel mixture in the compression stroke of the piston interacts with the secondary injection fuel, such that the air-fuel mixture does not collide with the bottom surface F1 of the bowl (B) of the piston 5, the fuel is evaporated in the strong intake flow in a short time, and the air-fuel mixture is stratified around the spark plug 11.

Further, the air-fuel mixture that gathers around the spark plug 11 as stated above is ignited by the spark plug 11 to be combusted, and at this point the secondary injection fuel is not attached to the bottom surface F1 of the piston 5 such that almost all the air-fuel mixture is combusted.

Meanwhile, the tip portion (TP) of the bowl (B) is formed along the round surface RS2 such that the concentration of the combustion pressure and heat is minimized to not form a crack thereof, and self-ignition is prevented.

For convenience in explanation and accurate definition in the appended claims, the terms "upper", "lower", "inside", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A piston of a gasoline direct engine, comprising:
a protuberance portion that protrudes upwards from an upper surface of the piston along a convexly circular arc shape having a radius (R1) that is about the same as a piston diameter (D) in an axis of a piston center (SP) to have a predetermined height (T) from the upper surface of the piston, and distal edge portion of the protuberance portion is concavely rounded to be connected with the upper surface;

a bowl (B) that has a bottom surface (F1) dented downwards from the upper surface of the piston, wherein the bowl (B) has an asymmetrical ellipse shape from a center portion of the protuberance portion to an intake side direction of the piston, the bottom surface of the bowl (B) becomes deeper in an exhaust side direction of the piston to have a predetermined slope angle ($\theta 1$), and an inner wall portion formed deepest in the bottom surface of the bowl (B) has a concavely circular arc shape to form a predetermined rising angle ($\theta 2$) at a tip portion thereof; and trumpet portions (TR), one edges of which are connected to edge ends (E) of the protuberance portion and the other edges of which are expanded in the intake side direction of the piston to be connected to the bowl (B).

2. The piston of a gasoline direct engine of claim 1, wherein the predetermined height (T) of the protuberance portion is in a range of approximately 5% to approximately 5.5% of the piston diameter (D).

3. The piston of a gasoline direct engine of claim 1, wherein the distal edge portion of the protuberance portion is formed along a round surface (RS1) of a circular arc (C2) having a diameter (Dl) ranging from approximately 80% to approximately 84% of the piston diameter (D).

4. The piston of a gasoline direct engine of claim 1, wherein the protuberance portion has a diameter (D2) ranging from approximately 78% to approximately 82% of the piston diameter (D) based on a point (P1) that is offset with a distance ranging from approximately 5% to approximately 7% of the piston diameter (D) from the piston center (SP) in the exhaust side direction to form a protuberance side end (V) of the distal edge portion to be connected to the upper surface of the piston.

5. The piston of a gasoline direct engine of claim 4, wherein the protuberance side end (V) is connected to the upper surface of the piston along a round surface (RS1) of a circular arc (C2) having a diameter (Dl) ranging from approximately 80% to approximately 84% of the piston diameter (D).

6. The piston of a gasoline direct engine of claim 4, wherein a connection point (P2) of the protuberance side end (V) and the edge ends (E) of the protuberance portion is determined in a point that is offset as much as a distance ranging from approximately 3% to approximately 5% of the piston diameter (D) from the piston center (SP) to the exhaust side direction.

7. The piston of a gasoline direct engine of claim 1, wherein the predetermined slope angle ($\theta 1$) of the bottom surface is determined such that the maximum depth of the bowl ranges from approximately 1% to approximately 1.25% of the piston diameter (D) from the upper surface.

8. The piston of a gasoline direct engine of claim 1, wherein the bottom surface extends in a predetermined distance between pockets of intake valves and is aligned to a fuel injector.

9. The piston of a gasoline direct engine of claim 1, wherein the edge ends (E) of the protuberance portion are formed with a circular arc (C6) having a diameter (D3) ranging from approximately 100% to approximately 105% of the piston diameter (D) based on a point (P3) that is offset by as much as a distance of approximately one third of the piston diameter (D) from the piston center (SP) to the exhaust side direction.

10. The piston of a gasoline direct engine of claim 9, wherein a tangential line angle ($\theta 3$) between two points (P4) connecting the edge ends (E) and outer circumference of the bowl (B) is approximately 100°.

11. The piston of a gasoline direct engine of claim 1, wherein the tip portion (TP) of the bowl is formed along a predetermined curvature with the inner wall portion of the bowl.

12. The piston of a gasoline direct engine of claim 1, wherein the predetermined rising angle ($\theta 2$) of the inner wall portion as a tangential line angle to the tip portion of the bowl is approximately 65°.

\* \* \* \* \*